United States Patent
Pattanaik et al.

(10) Patent No.: US 12,175,270 B2
(45) Date of Patent: Dec. 24, 2024

(54) SYSTEM AND METHOD OF CODE EXECUTION AT A VIRTUAL MACHINE ALLOWING FOR EXTENDIBILITY AND MONITORING OF CUSTOMIZED APPLICATIONS AND SERVICES

(71) Applicant: The Bank of New York Mellon, New York, NY (US)

(72) Inventors: Sarthak Pattanaik, Bernardsville, NJ (US); Madhusudan Rana, Casselberry, FL (US); Vadim Pertsovskiy, Chicago, IL (US)

(73) Assignee: The Bank of New York Mellon, New York, NY (US)

( * ) Notice: Subject to any disclaimer, the term of this patent is extended or adjusted under 35 U.S.C. 154(b) by 726 days.

(21) Appl. No.: 17/185,785

(22) Filed: Feb. 25, 2021

(65) Prior Publication Data
US 2022/0269523 A1    Aug. 25, 2022

(51) Int. Cl.
*G06F 9/455* (2018.01)
*G06F 9/54* (2006.01)
(Continued)

(52) U.S. Cl.
CPC .......... *G06F 9/45558* (2013.01); *G06F 9/541* (2013.01); *H04L 9/0643* (2013.01);
(Continued)

(58) Field of Classification Search
None
See application file for complete search history.

(56) References Cited

U.S. PATENT DOCUMENTS 10,579,368 B2 * 3/2020 Wisnovsky ........... H04L 9/3297
11,614,957 B1 * 3/2023 Mandadi ............... G06F 9/5077
                                                      718/1

(Continued)

FOREIGN PATENT DOCUMENTS

WO           200060466 A1     10/2000
WO    WO-2016053973 A1 *   4/2016  ......... G06F 11/3006

OTHER PUBLICATIONS

International Preliminary Report on Patentability for Corresponding International Application No. PCT/US2022/016848 issued Aug. 29, 2023, 5 pages.

*Primary Examiner* — Lewis A Bullock, Jr.
*Assistant Examiner* — Melissa A Headly
(74) *Attorney, Agent, or Firm* — Dinsmore & Shohl LLP (57) ABSTRACT

A processing system allows external systems to customize and extend services without increasing system intricacy. The processing platform maintains cloud containers that support virtual machines for external systems. An external system provides code for execution on a virtual machine that is supported by a cloud container. Cloud containers provide a boundary for executing code such that the processing platform may limit types of code an external system can run at a cloud container. The external system code can provide new services or may build upon existing public services, and external systems may designate their services as being available to other external systems by publishing the access information in a global application programming interface (API) maintained by the processing platform. Since the external systems submit instructions for execution within their assigned cloud containers, the services and applications are developed without affecting the underlying functionality of the processing platform.

23 Claims, 6 Drawing Sheets

(51) Int. Cl.
*H04L 9/00* (2022.01)
*H04L 9/06* (2006.01)
(52) U.S. Cl.
CPC ............... *G06F 2009/4557* (2013.01); *G06F 2009/45575* (2013.01); *G06F 2009/45595* (2013.01); *H04L 9/50* (2022.05)

(56) References Cited

U.S. PATENT DOCUMENTS

| | | |
|---|---|---|
| 2013/0227558 A1 | 8/2013 | Du et al. |
| 2016/0170915 A1 | 6/2016 | Brigmohan |
| 2017/0208203 A1 | 7/2017 | Hayashi |

* cited by examiner

SYSTEM AND METHOD OF CODE EXECUTION AT A VIRTUAL MACHINE ALLOWING FOR EXTENDIBILITY AND MONITORING OF CUSTOMIZED APPLICATIONS AND SERVICES

BACKGROUND

Field of Art

This disclosure relates generally to computing system augmentation and more particularly to extendable external system code deployment on a distributed, and scalable computing platform.

Description of Art

As computing systems age, they tend to become increasingly complex and difficult to alter. A legacy system may have accumulated many layers of applications and code to provide new or updated services. Although providing increased functionality, additional applications and changes to the codebase of a computing system also lead to increasingly complex systems and maintenance requirements.

Rather than increasing how complex a computing system is until it is unfeasible to make further updates, it would be useful to have a way for additional functionalities and applications to be added on top of a base system computing layer independently from changes to the supporting computing system code. Furthermore, to accommodate differing requirements of external systems or other entities that may use the computing system functions and resources, it would be useful to allow external systems to implement additional customized functions, services, and dynamic logic without increasing how complex an underlying system and its dependencies are.

SUMMARY

A system described herein includes a processing platform that allows external systems (to the processing platform) to deploy instructions to the processing platform to execute an action, to execute dynamic logic, and to define and publish services for future access by the external system and/or other external systems. The instructions deployed by the external system may be used to change the way an existing defined service functions or may establish new services and functionalities. In addition to establishing new functionalities for services and resources deployed by the underlying processing platform, instructions deployed by an external system may be used to determine conditions for and time(s) of executing an action.

The processing platform generates and manages cloud container instances that support external system codebases. A cloud container is a logical or physical machine partition that is configured to support virtual machines for execution of external system code and may be a cloud container on a cloud computing system. The processing platform also maintains separation between external system code deployed by different external systems associated with the processing platform. Since the external system code is executed on virtual machines within separate cloud containers or cloud containers that can be instantiated or destroyed based on capacity needs, the processing platform can provide unlimited scalability and capacity to external systems that may require a large amount of processing time and memory space to support and implement the services defined in the external system code.

In one embodiment, the processing platform accepts instructions from an external system in the form of compiled plaintext (e.g., an ascii string of operation codes) which may be included within messages sent between the external system and the processing platform or as other portions of files or alternative communications between the external system and the processing platform. In one embodiment, instructions received from the external system are formatted as plaintext included in a message designating an action to perform based on a condition described by the included external code.

In various embodiments, the processing platform saves compiled hashes of prior code versions in a blockchain. A code verification blockchain at the processing platform may save hashed prior code versions for external systems that have current or previous cloud containers on the processing platform. In some embodiments, the cloud containers may alternately or additionally save a blockchain at a platform virtual machine within each cloud container and use the blockchains to track history of resource use and code versions at the cloud containers.

The processing platform may be configured to manage and support the functionalities of a plurality of external system cloud containers hosting virtual machines. The virtual machines can execute external system code defining services or prompts for actions to be performed on behalf of the external system. The processing platform instantiates new cloud containers as they are requested by external systems and builds or reduces the resources available to a cloud container according to the requirements for executing the external system code.

External system code is received at the processing platform (e.g., code may be received in the form of an instruction message with a compiled string of external system code operations). The message from the external system may include a signature, a source code hash, a compile time, and a hash of a prior version of the compiled external system code. The processing platform can verify the received message against a saved blockchain of previous code versions before providing the external system code for execution at the correct cloud container. Based on the information in the message associated with the external system code, the processing platform may generate and save access information for the external system code in a global API database so that the external system code can provide public services to other external systems. The global API database provides access to public services for external systems that want to use or expand on the available public services deployed by the processing platform or by other external systems.

In one embodiment, the processing platform manages a cloud container for each external system that submits code for executing actions at the processing platform. A cloud container is instantiated on a server (e.g., such as a cloud server) and is configured to support a virtual machine for executing external system code within a virtual machine associated with the processing platform that manages and monitors execution of services on the cloud container. The processing platform adjusts resource allocations to the cloud container according to the needs of the external system. The cloud container manages and supports physical and logical constraints of the services that are executed on virtual machines within the cloud container.

A cloud container hosts a platform virtual machine (e.g., a JAVA Virtual Machine) that manages and executes logic and services on behalf of the external systems by the processing platform. The platform virtual machine accesses and executes functions defined by services that are available to the external system via a global API database. In one embodiment, the platform virtual machine allows the processing platform to limit and monitor resource use and access to other services.

In various embodiments, the processing platform tracks resources used by virtual machines associated with external systems to determine resources that have been or will need to be made available to complete execution of the external system code. Some resources that may be tracked include computing time and memory space utilization.

A second virtual machine within the platform virtual machine serves as another logical cloud container that manages interpretation and execution of external system code sent by the external system for execution at the cloud container. In addition to being configured to interpret external system code for execution, this secondary code execution virtual machine serves as a system boundary that prevents the deployed external system code from being accessed or executed beyond the specific function requests at the boundary of the code execution virtual machine. The resources and services available for an external system for execution may be limited by the processing platform by limiting what information can be passed into an code execution virtual machine.

The features and advantages described in this summary and the following detailed description are not limiting and not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a high-level block diagram of a system environment for a processing platform, in accordance with an example embodiment.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures having that reference numeral.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
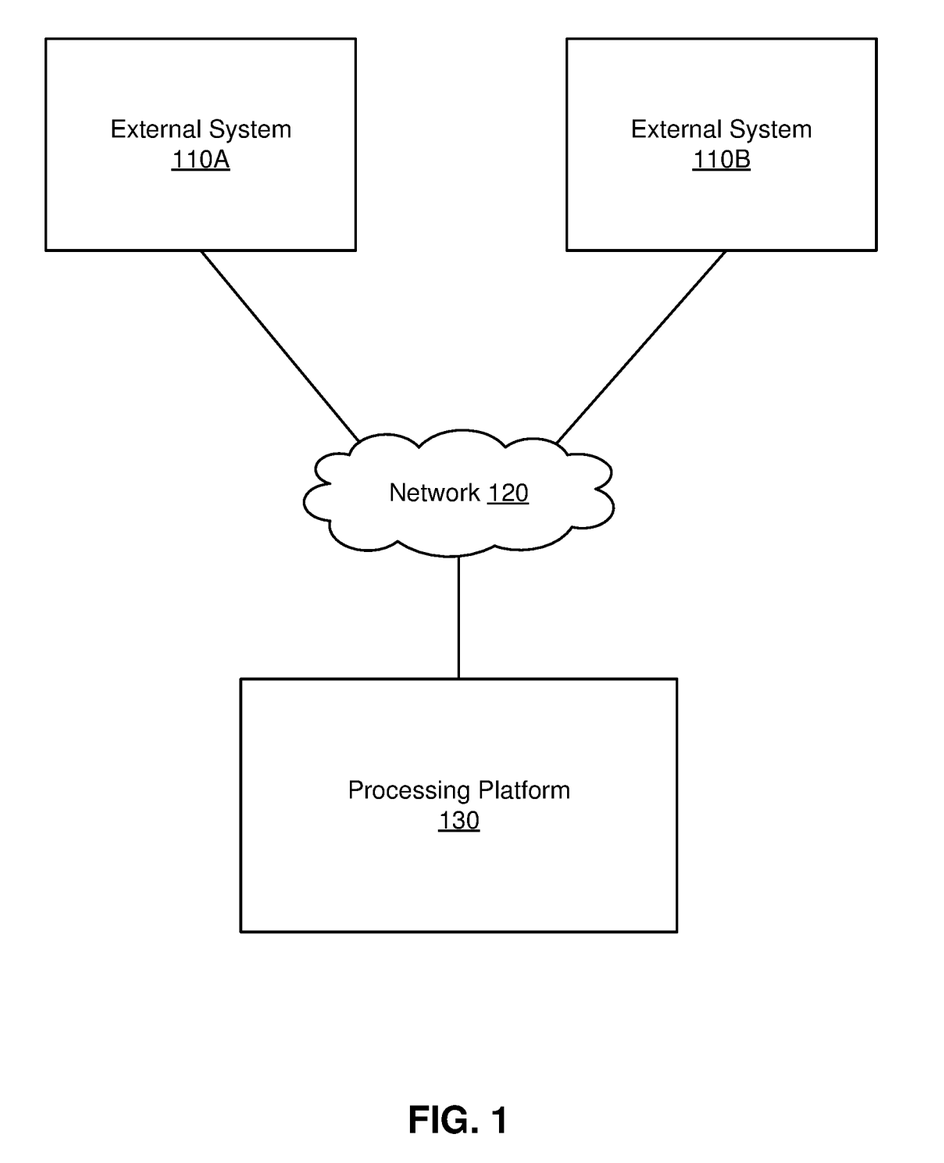

FIG. 1 is a high-level block diagram of a system environment for a processing platform 130, in accordance with an example embodiment. In the example of FIG. 1, a system environment includes external systems 110, a network 120, and the processing platform 130. For clarity, although two example external systems 110 (i.e., external system 110A and external system 110B) are shown in FIG. 1, alternate embodiments of the system environment can have any number of external systems 110. The functions performed by the various entities of FIG. 1 may also differ in different embodiments. The processing platform 130 manages and maintains processing services that are available to the external systems 110. The processing platform 130 also facilitates additions and customizations made by an external system 110 for augmentation of supported processing services. The processing platform 130 receives code and optionally an action for performance based on the code from the external systems 110. The processing platform 130 executes the code in an isolated virtual machine within a cloud container while allowing the code access to functions and other resources via interfaces accessible through the virtual machine. By executing the code within the isolated virtual machine, the processing platform may provide opportunity for extendable system-specific customizations of processing platform services and the use of dynamic rules for executing actions on behalf of an external system, without affecting how complex the processing platform is as new features are added.

Users and entities associated with systems outside of the processing platform interact with the processing platform 130 via an external system 110. The external system 110 is a computer system that can access and interface with the processing platform 130. In various embodiments, different types of devices and machines can be external systems 110. External systems 110 may be servers, desktop computers, laptop computers, mobile computing devices such as smartphones or tablets, and/or distributed computing systems.

The external systems 110 communicate with the processing platform 130 via the network 120. The network 120 may comprise any combination of local area and wide area networks employing wired or wireless communication links.

Figure 2:
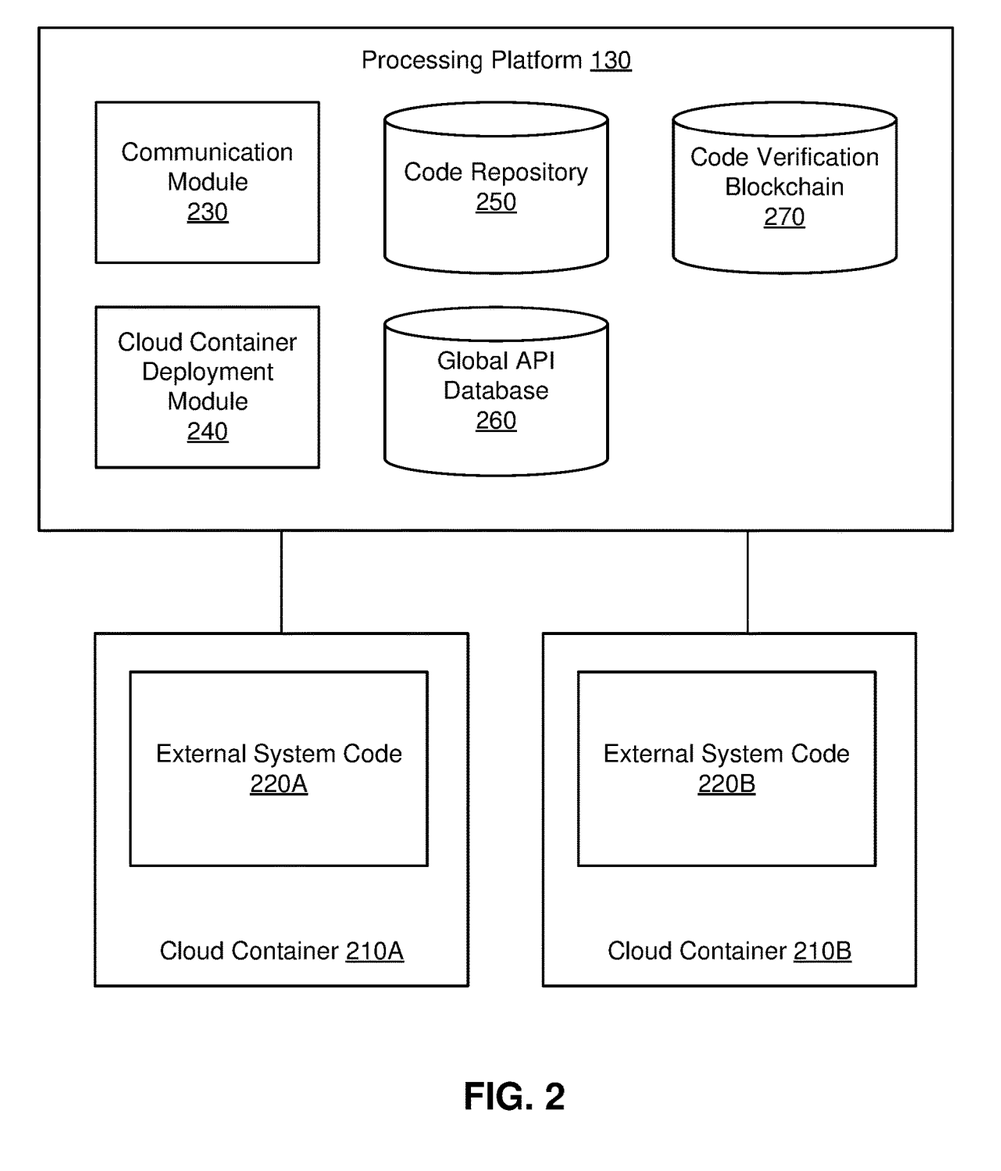
FIG. 2 is a high-level block diagram of a system architecture for the processing platform, in accordance with an example embodiment.

FIG. 2 is a high-level block diagram of a system architecture for the processing platform 130, in accordance with an example embodiment. The processing platform 130 includes various modules and datastores to facilitate storage, access, and execution of external system code at cloud containers that are maintained by the processing platform 130. A cloud container maintained by the processing platform is a logical or physical machine partition that is configured to support virtual machines for execution of external system code. The processing platform 130 comprises a communication module 230, a cloud container deployment module 240, a code repository 250, a global application programming interface (API) database 260, and a code verification blockchain 270. The processing platform 130 manages and maintains cloud containers 210 that may be external to the processing platform 130 in some embodiments. A cloud container 210 is associated with an external system 110 and supports external system code 220. Computer components such as web servers, network interfaces, load balancers, operations consoles, and the like are not shown so as to not obscure the details of the system architecture. Additionally, the processing platform 130 may contain more, fewer, or different components than those shown in FIG. 2 and the functionality of the components as described herein may be distributed differently from the description herein.

The processing platform 130 is configured to manage and support the functionalities of a plurality of cloud containers 210 that host virtual machines for external systems 110. A cloud container 210 hosts virtual machines that execute external system code 220 defining services or prompts for actions to be performed on behalf of the associated external system 110. A cloud container 210 defines physical and logical constraints for the virtual machines and the external system code 220. The cloud container 210 may be a computing system cloud container (e.g., a DOCKER container) that defines an amount of memory space and processing capabilities that can be allocated to the computations of the external system 110 and that allows the processing platform to keep customizations to external system code 220 and processes separate from the processing platform infrastructure. In different embodiments, the processing platform 130 maintains cloud containers 210 at local machines, or may maintain cloud containers 210 on an external computing platform. In one embodiment, the processing platform 130 maintains separate cloud containers 210 for different external systems 110 to facilitate separation of external system code 220 received from the different external systems 110. The example illustration of FIG. 2 demonstrates two cloud containers 210 (i.e., cloud container 210A and cloud container 210B), each with their respective external system code 220 (i.e., external system code 220A and external system code 220B). However, a processing platform 130 may manage fewer or more cloud containers 210 in various embodiments, depending on the requirements and requests of the external systems 110, and the number of cloud containers 210 that the processing platform 130 manages may change over time. Additional information about the cloud containers 210 and external system code 220 is described below.

The communication module 230 receives messages from external systems 110 at the processing platform 130. Messages from external systems 110 may include information about an action to be executed, and may further include conditional logic or other calls to services that can be referenced by the external system 110 via APIs that are available in the global API database 260. The information in a message may include actions to be executed at the processing platform and/or execution of external system code at a virtual machine. For example, a condition for triggering an action may be the code executed at a virtual machine hosted by a cloud container 210, while the action itself may be a process executed by the processing platform 130 in response to the triggering condition being met. In some cases, a trigger for an action may be that the specified conditions of one external system match up or otherwise correspond to trigger conditions of another external system. That is, a message from an external system 110 may include conditions for triggering execution of an action responsive to another external system 110 having a certain state that corresponds to specified parameters. Two or more external systems 110 can thus interact by performing actions in response to corresponding triggers without being in direct contact with one another regarding the interaction. In one embodiment, the communication module 230 accepts external system code from the external system 110 in the form of plaintext (e.g., an ascii string of operation codes) which may be included within messages sent between the external system 110 and the processing platform or as other portions of files or alternative communications between an external system 110 and the processing platform 130. The message received at the communication module 230 from the external system 110 may indicate that an action should be executed if conditions specified in the conditional logic and/or via other services are met. The communication module 230 also configures parameters of the cloud container 210 associated with the external system 110, and configures the external system code 220 that is available for execution by the virtual machines within the cloud container 210 by updating saved code such as by updating the code verification blockchain 270 to record the changes made to the external system code 220. To the extent that the external system code 220 includes services that are exposed for use by other external systems 110, the communication module 230 may generate a description and access information about the public services and make them available to other external systems 110 by publishing the descriptions and access information in the global API database 260. In one embodiment, the external system code 220 may be received at the communication module 230 in a message from the external system 110, in which case, the communication module 230 may compile the external system code 220 into a machine-readable format such as a compiled-ascii string of operations before passing it on to the other modules for access and storage.

The cloud container deployment module 240 monitors and manages creation and maintenance of the cloud containers 210 for the processing platform 130. The cloud container deployment module 240 instantiates new cloud containers as they are requested by external systems 110. The cloud container deployment module 240 also increases or reduces the computing resources available to a cloud container according to the needs of the associated external system 110. In one embodiment, the cloud container deployment module 240 may interact with a computing platform that hosts the cloud containers 210 to manage creation of new cloud containers 210, deletion of cloud containers 210 that are no longer needed by an external system 110, and changes to resources such as the memory space and processing capabilities that are available to a cloud container 210.

The code repository 250 saves code and other information received in messages from external systems 110. A cloud container 210 can access the code and information at the code repository 250 of the processing platform 130 and, if the particular cloud container 210 is allowed to access and use the code, the code or information may be used by the cloud container 210 as part of its external system code 220. In addition to accessing and retrieving external system code from the external system 110 with which it is associated, a cloud container 210 may access and use functions and services that other external systems 110 have made publicly available, for example, via public calls to an API deployed by another external system 110 and saved at the global API database 260.

The global API database 260 maintains access information for publicly available services defined by external systems 110 or supported by the processing platform 130. Information in the global API database 260 may include a name of a service, function names deployed by the service, and expected inputs to the functions. Using this information, other external systems 110 can access and use public services that are saved at the code repository 250 and the services can be performed at a cloud container 210. That is, when external system code 220 that is designated for public use is received from an external system 110, information about the external system code 220 and information for accessing public interfaces of the external system code 220 is registered with the global API database 260. Thus, execution of external system code 220 on one cloud container 210 can, through the use of functions at the global API database 260, cause the execution of external system code 220 on another system, such as at another cloud container 210.

In one embodiment, the processing platform 130 guarantees immutability to code and other information received from the external systems 110 by storing compiled hashes of prior code versions in a blockchain. The code verification blockchain 270 saves hashed prior code versions for external systems 110 that have current or previous cloud containers 210 on the processing platform 130. The code verification blockchain 270 archives and hashes the code versions received from the external systems 110 to ensure that the code is accurate, effective, and can be executed repeatedly. Storage of code on the external system code on the code verification blockchain 270 ensures immutability of the stored code versions and allows the processing platform 130 to manage storage and archiving of past code versions. In some embodiments, the cloud containers 210 alternately or additionally save a blockchain at a platform virtual machine within the cloud container 210 to track history of external system 110 resource use and code versions at the cloud container 210.

A message received from an external system 110 may include a signature of the external system 110, a source code hash, a compile time, and a hash of a prior version of the compiled code. The communication module 230 verifies the received message against the external system code for the external system 110 saved in the code verification blockchain 270 before providing the external system code for execution at the correct cloud container 210. Additional information about how the code verification blockchain 270 is used to verify received information from an external system 110 is included in the description of FIG. 4.

Figure 3:
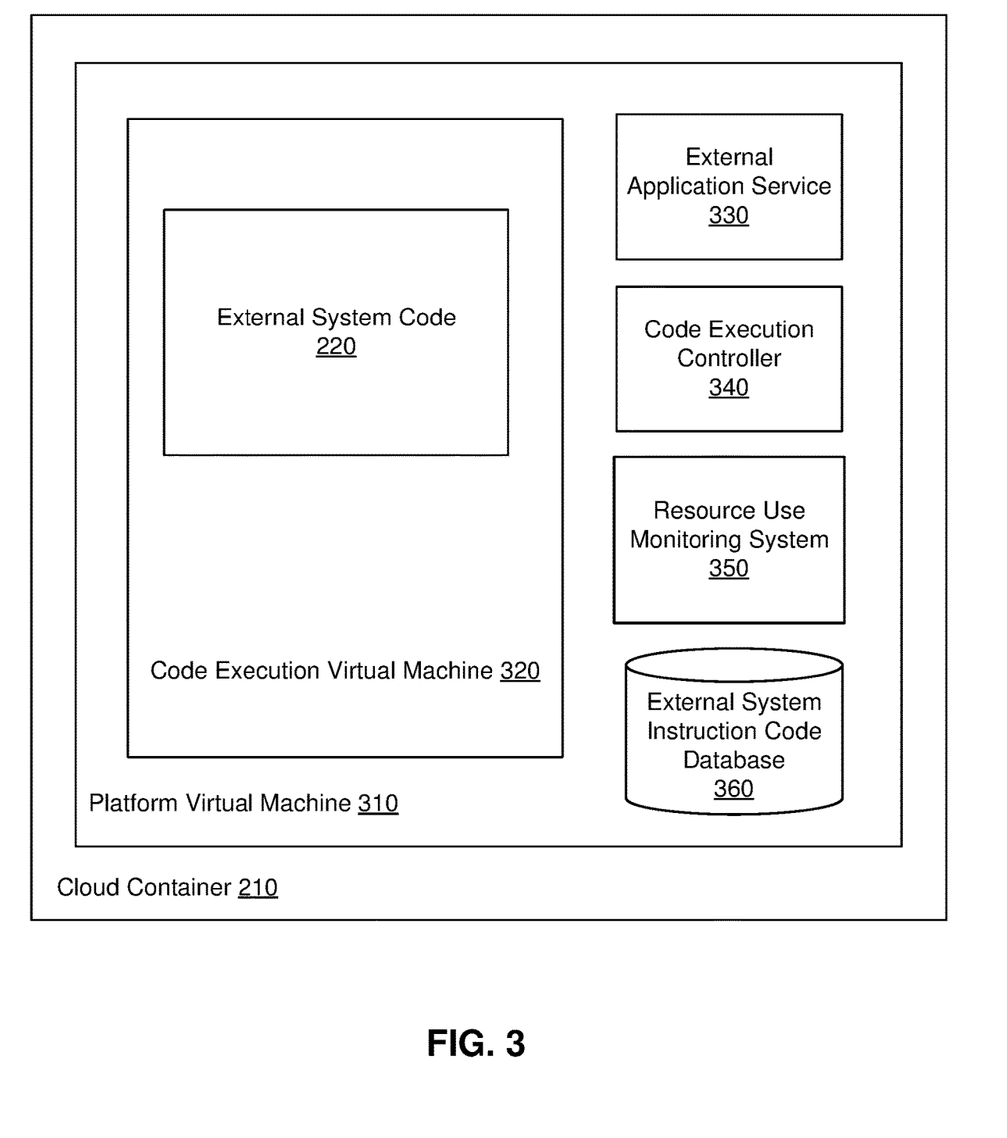
FIG. 3 is a high-level block diagram of a cloud container, in accordance with an example embodiment.

FIG. 3 is a high-level block diagram of a cloud container 210, in accordance with an example embodiment. The cloud container 210 is associated with an external system 110, and supports execution of external system code 220 in relation to the processing platform 130. The cloud container defines physical and logical constraints of the services that are run on behalf of the external system 110, and defines an amount of memory space and processing capabilities that can be used for external system 110 computations. Rather than directly executing the external system code 220, the cloud container 210 includes a platform virtual machine 310 that manages services related to accessing code for execution and monitors computing resources. The platform virtual machine 310 itself supports a code execution virtual machine 320 that isolates the external system code 220 and manages execution of the external system code 220. The platform virtual machine 310 supports an external application service 330, a code execution controller 340, a resource use monitoring system 350, and an external system instruction code database 360. The cloud container 210 may be a logical or physical partition of a machine, and the cloud container 210 may be on one or more physical computing systems local to the processing platform, and/or may be on more or more remote computing systems. Computer components of the cloud container 210 such as web servers, network interfaces, load balancers, operations consoles, and the like are not shown so as to not obscure the details of the architecture of the cloud container 210. Additionally, a cloud container may include more, fewer, or different components than those shown in FIG. 3 and the functionality of the components as described herein may be distributed differently from the description herein.

The cloud container 210 hosts a platform virtual machine 310, for example, a JAVA virtual machine. The platform virtual machine 310 manages and executes logic and services deployed to the cloud container by the processing platform 130. For example, the platform virtual machine 310 may access and execute functions defined by services that are available to the external system 110 via the global API database 260. In one embodiment, the platform virtual machine is a virtual machine for executing from the processing platform 130 and allows the processing platform 130 to limit and monitor resource use and accesses made by an external system's external code (when executed in the code execution virtual machine 320) to other services.

Within the cloud container 210, the platform virtual machine 310 supports the code execution virtual machine 320. The code execution virtual machine 320 is another logical cloud container within the platform virtual machine 310 that manages interpretation of instructions sent by the external system 110 for execution at the associated cloud container 210. In addition to being configured to interpret external system 110 instructions as external system code 220 for execution, the code execution virtual machine 320 is a system boundary that prevents the deployed external system code 220 from being executed beyond the cloud container 210. Additionally, the code execution virtual machine 320 may limit what external system code 220 can execute within the cloud container 210 in cases in which the processing platform 130 has implemented rules or limits to types of executable data that can be deployed by an external system 110 to the cloud container 210.

The external system code 220 is saved at temporary memory space within the code execution virtual machine 320. The external system code 220 exists in a logical space where the external system code 220 can be executed and interact with capabilities and services that are available within the code execution virtual machine 320. In one embodiment, different versions of the external system code 220 may also be accessed and/or verified at the external system instruction code database 360. The external system code 220 can include definitions of new services and functionalities for execution at the cloud container 210. In some embodiments, the external system code 220 also includes instructions that customize and extend existing services and functions that are already available to the external system 110. For example, external system code 220 from one external system 110 may include external system code that adds logic and functionality to a service that is made publicly available by another external system 110 via the global API database 260.

The platform virtual machine 310 includes an external application service 330. The external application service 330 is a module that allows an external system 110 to include dynamic logic defined by the external system code 220. The external application service 330 is accessible to external system code 220 running on the code execution virtual machine 320 via the platform virtual machine 310. In one embodiment, the external application service 330 includes one or more services that are available to the external system 110 based on the description of the service in the global API database 260, and the service may be supported by the external system code 220 of a different external system 110 of the processing platform 130, by services deployed directly by the processing platform 130, or by another available external service. For example, external system code 220 may include instructions to access a service that is available via the global API database 260, and to transmit a request to the service. The information received from the API call may then be used in the process of execution of the external system code 220. Since services are available via the global API database 260, calling a public service includes identifying the service name, a function name of a function deployed by the service, and inputs to the function.

The code execution controller 340 manages provisions of messages, including compiled code, received from the external system 110 to the code execution virtual machine 320. The code execution controller 340 also manages communication for the code execution virtual machine 320 with the processing platform 130 to request execution of actions when conditional logic of the external system code 220 running on the code execution virtual machine 320 resolves to certain prompting values. For example, the external system code 220 may include conditional logic that, when met, requests the execution of a process that is managed at the processing platform 130. When the condition is met, the code execution virtual machine 320 communicates with the code execution controller 340 to request the execution of the remote process. Such conditions may include detection of certain states or execution of actions of other external system 110. For example, the code execution controller 340 may request execution of an action responsive to a value calculated at the code execution virtual machine 320 using the external system code 220 matching or otherwise corresponding to a value generated by another cloud container 210 associated with a different external system 110. The code execution controller 340 manages interactions with the processing platform to execute the remote functions or services that are requested by the code execution virtual machine 320.

The code execution controller 340 also maintains an execution schedule for external system code 220 that is loaded and executed on the code execution virtual machine 320. Depending on the instructions from the external system 110, the code execution controller 340 may schedule specific code to be loaded as external system code 220 into the code execution virtual machine 320 at appropriate times. For example, instructions from the external system 110 may specify that a value should be noted every day at 4:00 pm and that, responsive to the value having certain characteristics (e.g., true vs. false, greater than a threshold number, etc.), the processing platform 130 should execute a specified function. The code execution controller 340 thus schedules the execution of the functions that identify the value for 4:00 pm every day and prompts the code execution virtual machine 320 to load and run the appropriate external system code 220 at the correct times accordingly.

The resource use monitoring system 350 of the platform virtual machine 320 monitors how much the cloud container 210 associated with an external system 110 uses services and resources of the processing platform 130. In various embodiments, the resource use monitoring system 350 may track resources used by an code execution virtual machine 320 to determine resource provisions for the external system 110 and to predict resources that will need to be allocated to the cloud container 210 for the code execution virtual machine 320 to be able to complete execution of the external system code 220. Some of the resources that the resource use monitoring system 350 may track for the processing platform 130 include computing time and memory space utilization.

The external system instruction code database 360 saves external system code 220 as received from the external system 110 via the processing platform 130. External system code 220 may be saved in the external system code database 360 for retrieval by the code execution virtual machine 320 to load when the particular external system code 229 is requested for execution. The external system instruction code database 360 can also save information about the registered services and API code associated with the external system 110 such that the code execution virtual machine 320 can access defined functions and services of the external system 110 locally for future use. In some embodiments, the external system instruction code database 360 includes a local blockchain that saves an immutable record of the external system code 220 deployed to the processing platform 130 from the external system 110 and a record of resource use at the cloud container 210.

As an example of using the cloud container 210 architecture, an external system 110 may send a message to the processing platform 130 that indicates an action to be executed on behalf of the external system 110. The message may include external system code 220 that defines a logical condition such that the requested action will be executed when the condition is true. The processing platform 130 transmits the external system code 220 to the code execution virtual machine 320 at the cloud container 210 associated with the external system 110. The external system code 220 may be saved in the external system instruction code database 360, and at a configured time set by the code execution controller 340, the external system code 220 is loaded and executed by the code execution virtual machine 320. Execution of the external system code 220 may include accessing external services via the external application service 330 to obtain outside information (e.g., if the condition is reliant on current events that can be verified by an outside or otherwise remote source). When the external system code 220 has executed, if calling the logical condition results in a true condition, the code execution virtual machine 320 transmits a request to the processing platform 130 via the code execution controller 340 to request that the action be executed.

Figure 4:
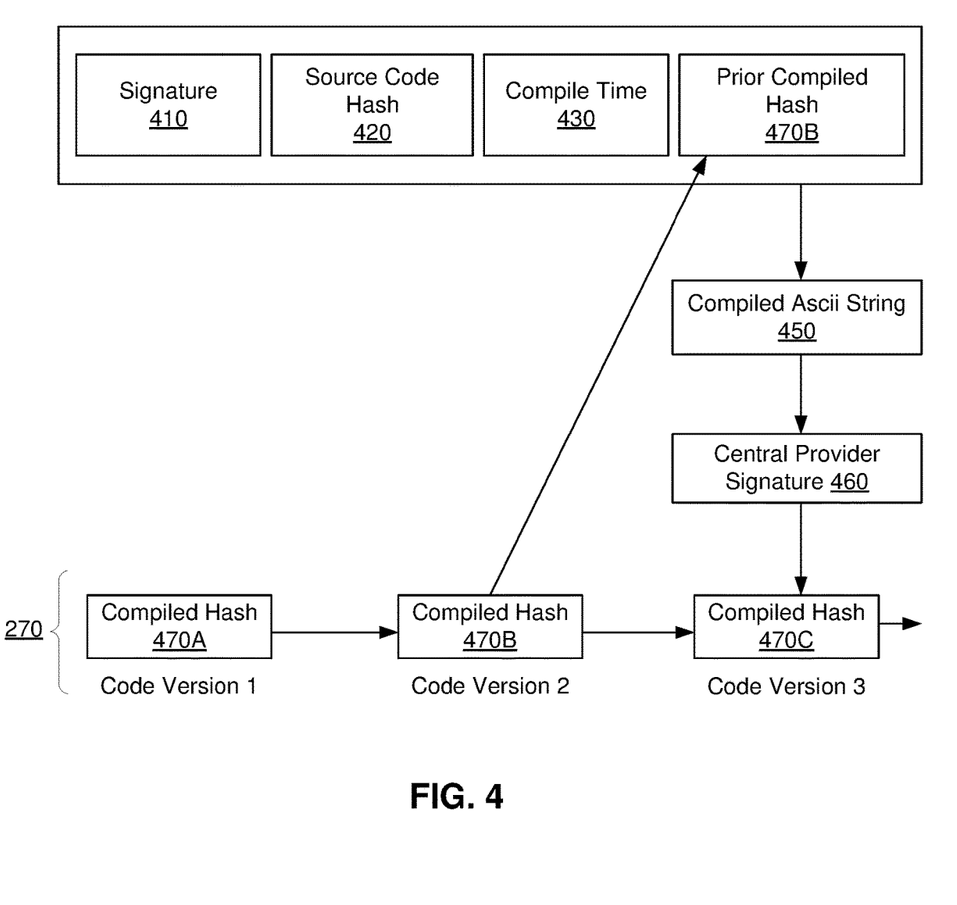
FIG. 4 is an example illustration of a portion of the code verification blockchain, in accordance with an embodiment.

FIG. 4 is an example illustration of a portion of the code verification blockchain 270, in accordance with an embodiment. The code verification blockchain 270 saves hashed prior code versions for external systems 110 that have current or previous cloud containers 210 supported by the processing platform 130. In some embodiments, the cloud containers 210 alternately or additionally save a blockchain at a platform virtual machine 310 within each cloud container 210 to track history of resource use and external system code 220 versions at the cloud container 210.

The code verification blockchain 270 adds immutability guarantees to the processing platform 130 and provides version control and record keeping when an external system 110 transmits updated external system code 220 for execution at a cloud container 210 and updated instructions for the processing platform 130. As shown in the example of FIG. 4, the code verification blockchain 270 includes compiled hashes 470 of code versions. For example, FIG. 4 includes compiled hash 470A of code version 1, a compiled hash 470B of code version 2, and a compiled hash 470C of code version 3.

The example of FIG. 4 illustrates how a new compiled hash 470C is added to the code verification blockchain 270. The external system 110 configures a set of information comprising a signature 410, a source code hash 420, a compile time 430, and a prior compiled hash 440. In other embodiments, the information set may contain more, fewer, or different data when constructing a compiled hash for inclusion in the code verification blockchain 270. The signature 410 is generated with a private key associated with the external system 110. In some embodiments, the external system 110 may manage its own private key. In other embodiments, such as embodiments in which compilation of the external system code 220 occurs at the processing platform 130 instead of at the external system 110, the processing platform 130 may manage the private key of the external system 110 with a key management service. The source code hash 420 is a hash of the source code that needs to be included in the compiled version of the external system code 220. This hash ensures a link to the actual version of the source code. As an example, the source code hash 420 may use a hashing algorithm such as SHA-256. In one embodiment, the compile time 430 is included in the data set. The compile time 430 represents the time it took for the source code to be compiled, for example into an ascii string of operations. The data set further includes the prior compiled hash 470. The prior compiled hash 470, as represented by prior compile hash 470B associated with code version 2, is the compiled hash of the previous version of the external system code 220 that was deployed by the external system 110 to the processing platform 130. Including the hash code of the prior block of the code verification blockchain 270 creates the source code version lineage.

The signature 410, source code hash 420, compile time 430, and prior compiled hash 470 are embedded into the compiled ascii string 450. Thus, the compiled ascii string 450 includes the payload definition that is used to create it along with the instructions for executing operations of the external system code 220. The compiled ascii string 450 is signed using the central provider signature 460. This signature generates the final compiled hash 470C that represents the current version of the source code and that can be used as external system code 220 by modules of the processing platform 130 that are allowed to access the code. Thus, to create the signature 410 and use it to update the current version of the source code, the external system 110 needs to have access to the prior compiled hash 470 and the private key associated with the external system 110. In case of conflict resolution, the code verification blockchain 270 can be accessed to prove whether a give code version was created by an external system 110 and executed by the processing platform 130 without any tampering. In various embodiments, additional information besides source code may be on the code verification blockchain 270.

Figure 5:
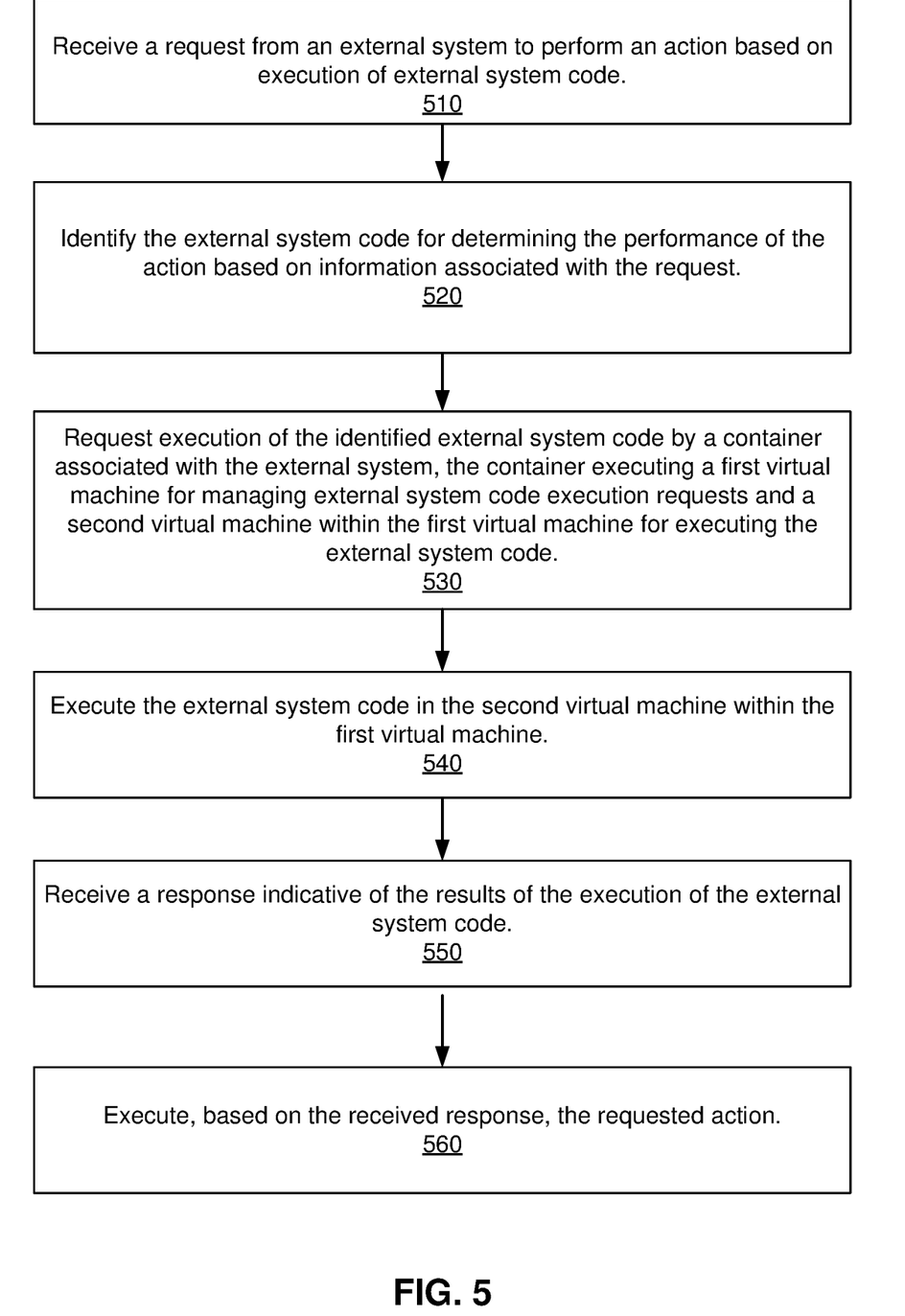
FIG. 5 is a flowchart illustrating a process of executing an action based on execution of external system code at a cloud container, in accordance with an example embodiment.

FIG. 5 is a flowchart illustrating a process of executing an action based on execution of external system code 220 at a cloud container, in accordance with an example embodiment. The processing platform receives 510 a request to perform an action based on execution of external system code 220. The processing platform identifies 520 the external system code 220 that was requested to be used for determining the performance of the action based on information associated with the request. The external system code 220 may be received at the processing platform 130 from the external system 110, and may be code that was received previously at the processing platform 130 and is saved at the code repository 250 and/or may be within a cloud container 210 associated with the external system 110. The processing platform 130 requests 530 execution of the identified external system code 220 by a cloud container 210 that is associated with the external system 110. The cloud container 210 supports a first platform virtual machine for managing external system code execution requests and the cloud container further supports a second code execution virtual machine 320 within the first virtual machine that is configured to execute external system code 220. The cloud container 210, via the virtual machines, executes 540 the external system code 220 and transmits the results of the execution to the processing platform 130. The processing platform receives 550 the response from the cloud container 210 that is indicative of the results of the execution of the external system code 220. Based on the results in the received response, the processing platform 130 executes 560 the requested action. In some cases, execution of the requested action may include requesting execution of one or more tasks associated with the requested action by other systems.

Figure 6:
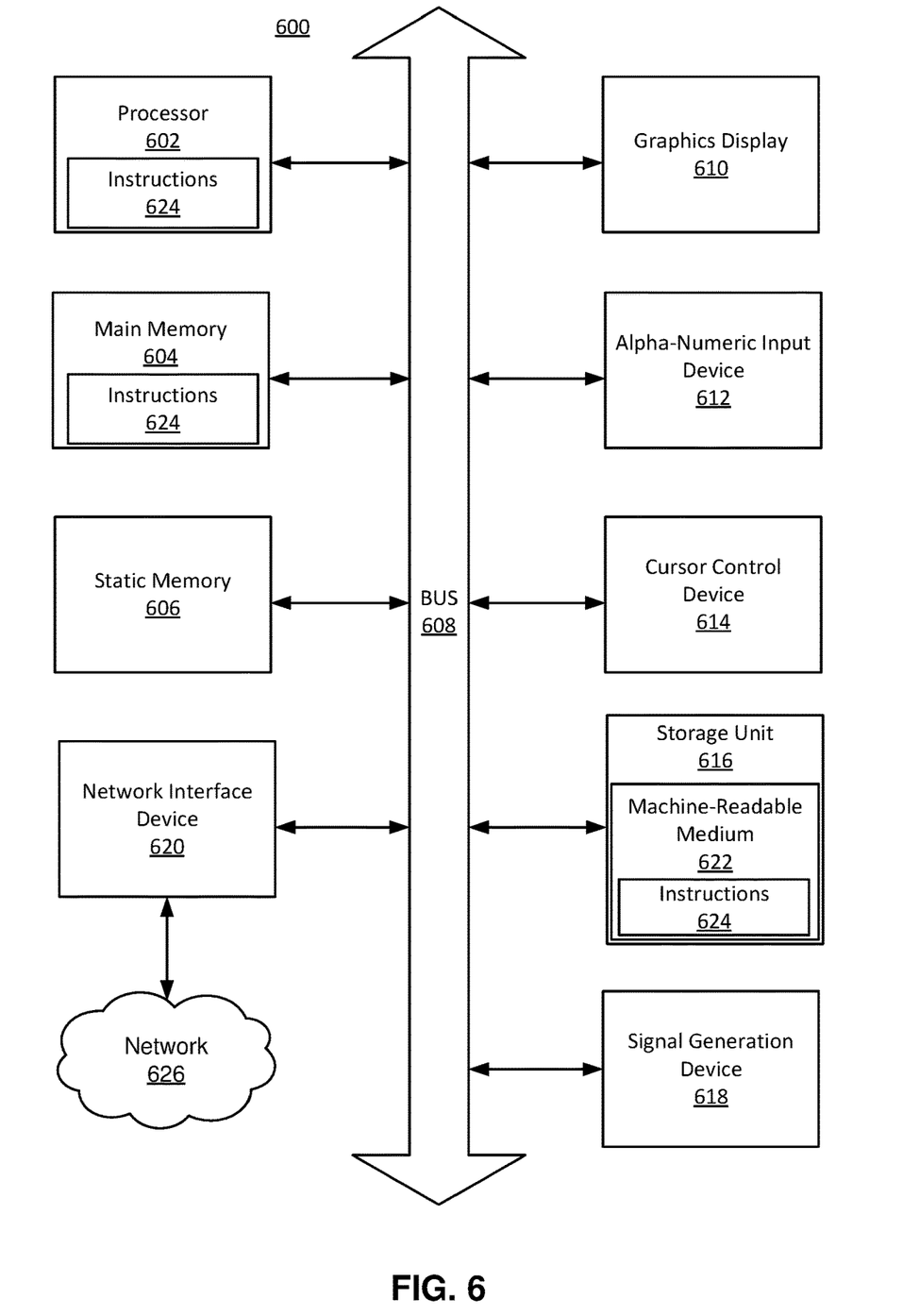
FIG. 6 is a block diagram illustrating components of an example machine able to read instructions from a machine-readable medium and execute them in one or more processors, in accordance with an embodiment.

FIG. 6 is a block diagram illustrating components of an example machine able to read instructions from a machine-readable medium and execute them in one or more processors (or controllers). Specifically, FIG. 6 shows a diagrammatic representation of the processing platform 130 and the containers 210 in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 606 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include instructions for implementing the functionalities of the communication module 230, the container management module 240, the code repository 250, the global API store 260, the code verification blockchain 270, the platform virtual machine 310, the code execution virtual machine 320, the external application service 330, the code execution controller 340, the resource use monitoring system 350, and the external system instruction code store 360. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626, such as the network 120, via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computing device coupled to a data storage device storing the computer program can correspond to a special-purpose computing device. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
receiving, at a processing platform, a request from an external system to perform an action based on execution of external system code, wherein the request comprises an instruction message comprising at least a prior compiled version hash of the external system code;
in response to receiving the external system code:
identifying one or more services defined in the external system code that are specified for public availability;
generating a description and access information for each of the one or more public services defined by the external system code;
publishing the description and access information for the one or more public services to a global application programming interface (API) database of services that are available to external systems; and
verifying, by the processing platform, the external system code included in the request by comparing the prior compiled version hash received in the instruction message of the request against a prior compiled version hash of the external system code for the external system saved in a code verification blockchain;
in response to verifying the external system code included in the request:
instantiating, by the processing platform, a cloud container associated with the external system in response to receiving the request;
identifying, by the processing platform, the external system code for determining the performance of the action based on information associated with the request;
requesting, by the processing platform, execution of the identified external system code by the cloud container associated with the external system, the cloud container executing a first virtual machine for managing external system code execution requests and a second virtual machine within the first virtual machine for executing the external system code;
accessing, by the first virtual machine, available services associated with the external system code from the global API database;
executing, by the cloud container, the external system code in the second virtual machine within the first virtual machine by accessing the available services from the first virtual machine;
receiving, by the processing platform, a response from the cloud container indicative of results of the execution of the external system code; and
based on the received response, executing, by the processing platform, the requested action, wherein the requested action includes requesting execution of one more tasks associated with the requested action by one or more systems other than the external system.

2. The computer-implemented method of claim 1, wherein the execution of the external system code by the second virtual machine is limited by a set of rules, set for the cloud container by the processing platform, for types of instructions that can be executed within the cloud container.

3. The computer-implemented method of claim 1, wherein the external system code extends the functionality of a service that is available to the second virtual machine via a global application programming interface (API) database of publicly available services.

4. The computer-implemented method of claim 1, further comprising:
storing, by the processing platform, prior versions of the external system code in a code verification blockchain.

5. The computer-implemented method of claim 1, wherein the external system code includes instructions to access a service that is available via a global Application programming interface (API) database, and wherein executing the external system code in the second virtual machine comprises transmitting a request to the accessed service.

6. The computer-implemented method of claim 5, wherein transmitting a request to the accessed service includes identifying a name of the service as defined by the global API database, a function supported by the service, and one or more inputs to the function.

7. The computer-implemented method of claim 1, wherein the external system code for determining the performance of the action specifies conditions to be met by the external system and corresponding conditions to be met by a state of a second external system to trigger the performance of the action.

8. The computer-implemented method of claim 1, wherein the results of the execution of the external system code include an indication that a value generated by the external system code matches a value generated by a second cloud container associated with a second external system.

9. A non-transitory computer-readable storage medium storing computer program instructions executable by one or more processors of a system, the stored instructions, when executed, causing the one or more processors to:
receive, at a processing platform, a request from an external system to perform an action based on execution of external system code, wherein the request comprises an instruction message comprising at least a prior compiled version hash of the external system code;
in response to receiving the external system code:
identify one or more services defined in the external system code that are specified for public availability;
generate a description and access information for each of the one or more public services defined by the external system code;
publish the description and access information for the one or more public services to a global application programming interface (API) database of services that are available to external systems; and
verify, by the processing platform, the external system code included in the request by comparing the prior compiled version hash received in the instruction message of the request against a prior compiled version hash of the external system code for the external system saved in a code verification blockchain;
in response to verifying the external system code included in the request:
instantiate, by the processing platform, a cloud container associated with the external system in response to receiving the request;
identify, by the processing platform, the external system code for determining the performance of the action based on information associated with the request;
request, by the processing platform, execution of the identified external system code by the cloud container associated with the external system, the cloud container executing a first virtual machine for managing external system code execution requests and a second virtual machine within the first virtual machine for executing the external system code;
access, by the first virtual machine, available services associated with the external system code from the global API database;
execute, by the cloud container, the external system code in the second virtual machine within the first virtual machine by accessing the available services from the first virtual machine;
receive, by the processing platform, a response from the cloud container indicative of results of the execution of the external system code; and
based on the received response, execute, by the processing platform, the requested action, wherein the requested action includes requesting execution of one more tasks associated with the requested action by one or more systems other than the external system.

10. The non-transitory computer-readable storage medium of claim 9, wherein the execution of the external system code by the second virtual machine is limited by a set of rules, set for the cloud container by the processing platform, for types of instructions that can be executed within the cloud container.

11. The non-transitory computer-readable storage medium of claim 9, wherein the external system code extends the functionality of a service that is available to the second virtual machine via a global application programming interface (API) database of publicly available services.

12. The non-transitory computer-readable storage medium of claim 9, further comprising instructions that, when executed, cause the one or more processors to:
save, by the processing platform, prior versions of the external system code in a code verification blockchain.

13. The non-transitory computer-readable storage medium of claim 9, wherein the external system code includes instructions to access a service that is available via a global Application programming interface (API) database, and wherein instructions to execute the external system code in the second virtual machine comprise instructions to transmit a request to the accessed service.

14. The non-transitory computer-readable storage medium of claim 13, wherein instructions to transmit a request to the accessed service include instructions to identify a name of the service as defined by the global API database, a function supported by the service, and one or more inputs to the function.

15. The non-transitory computer-readable storage medium of claim 9, wherein the external system code for determining the performance of the action specifies conditions to be met by the external system and corresponding conditions to be met by a state of a second external system to trigger the performance of the action.

16. The non-transitory computer-readable storage medium of claim 9, wherein the results of the execution of the external system code include an indication that a value generated by the external system code matches a value generated by a cloud container associated with a second external system.

17. A computer system comprising:
one or more computer processors for executing computer program instructions; and
a non-transitory computer-readable storage medium storing instructions executable by one or more processors of the system, the stored instructions, when executed, causing the one or more processors to:
receive, at a processing platform, a request from an external system to perform an action based on execution of external system code, wherein the request comprises an instruction message comprising at least a prior compiled version hash of the external system code;
in response to receiving the external system code:
identify one or more services defined in the external system code that are specified for public availability;
generate a description and access information for each of the one or more public services defined by the external system code;
publish the description and access information for the one or more public services to a global application programming interface (API) database of services that are available to external systems; and
verify, by the processing platform, the external system code included in the request by comparing the prior compiled version hash received in the instruction message of the request against a prior compiled version hash of the external system code for the external system saved in a code verification blockchain;
in response to verifying the external system code included in the request:
instantiate, by the processing platform, a cloud container associated with the external system in response to receiving the request;
identify, by the processing platform, the external system code for determining the performance of the action based on information associated with the request;
request, by the processing platform, execution of the identified external system code by the cloud container associated with the external system, the cloud container executing a first virtual machine for managing external system code execution requests and a second virtual machine within the first virtual machine for executing the external system code;
access, by the first virtual machine, available services associated with the external system code from the global API database;
execute, by the cloud container, the external system code in the second virtual machine within the first virtual machine by accessing the available services from the first virtual machine;
receive, by the processing platform, a response from the cloud container indicative of results of the execution of the external system code; and
based on the received response, execute, by the processing platform, the requested action, wherein the requested action includes requesting execution of one or more tasks associated with the requested action by one or more systems other than the external system.

18. The computer system of claim 17, wherein the execution of the external system code by the second virtual machine is limited by a set of rules, set for the cloud container by the processing platform, for types of instructions that can be executed within the cloud container.

19. The computer system of claim 17, wherein the external system code extends the functionality of a service that is available to the second virtual machine via a global application programming interface (API) database of publicly available services.

20. The computer system of claim 17, further comprising instructions that, when executed, cause the one or more processors to:
save, by the processing platform, prior versions of the external system code in a code verification blockchain.

21. The computer system of claim 17, wherein the external system code includes instructions to access a service that is available via a global Application programming interface (API) database, and wherein instructions to execute the external system code in the second virtual machine comprise instructions to transmit a request to the accessed service.

22. The computer system of claim 17, wherein the external system code for determining the performance of the action specifies conditions to be met by the external system and corresponding conditions to be met by a state of a second external system to trigger the performance of the action.

23. The computer system of claim 17, wherein the results of the execution of the external system code include an indication that a value generated by the external system code matches a value generated by a cloud container associated with a second external system.

* * * * *